April 19, 1966  J. F. SCUDDER  3,246,585
PHOTOGRAPHIC EXPOSURE CONTROL MECHANISM
Filed July 23, 1963  2 Sheets-Sheet 1

JAMES F. SCUDDER
INVENTOR.

BY R. Frank Smith
Eugene S. Stephens
ATTORNEYS

April 19, 1966  J. F. SCUDDER  3,246,585
PHOTOGRAPHIC EXPOSURE CONTROL MECHANISM
Filed July 23, 1963  2 Sheets-Sheet 2

JAMES F. SCUDDER
INVENTOR.

BY R. Frank Smith
Eugene S. Stephens
ATTORNEYS

United States Patent Office 3,246,585
Patented Apr. 19, 1966

3,246,585
PHOTOGRAPHIC EXPOSURE CONTROL MECHANISM
James F. Scudder, Rochester, N.Y., assignor to Eastman Kodak Company, Rochester, N.Y., a corporation of New Jersey
Filed July 23, 1963, Ser. No. 296,957
6 Claims. (Cl. 95—10)

This invention relates to a photographic exposure control mechanism, and more particularly to a structure for adjusting a photographic exposure setting member in response to the position of a movable armature of an electromagnet that is variably energized as a function of scene light.

Previously known photographic exposure control mechanisms have been either inaccurate, unreliable, or complicated and costly to manufacture. Such shortcomings have militated against use of exposure control systems in relatively inexpensive, simple cameras designed to withstand rough use.

To overcome such disadvantages, it is an object of this invention to provide a photographic exposure regulating device that is simple to operate, reliable and accurate in its functioning, economical to manufacture, and rugged enough to sustain rough use. Another object of the invention is to provide a low light signal with such an exposure control device.

These and other objects of the invention are accomplished in a camera by aperture adjusting means and photocell illumination varying means, both of which are movable in response to movement of the camera's actuating mechanism and means for arresting and holding the aperture adjusting means in a position correlated with scene light, which position is selected in cooperation with the armature of an electromagnet that is variably energized as a function of illumination of the photocell. For illumination of the entire photocell at a value less than a predetermined low value, the armature cooperates with a signal member for indicating such low light condition to the camera operator.

Figure 3:
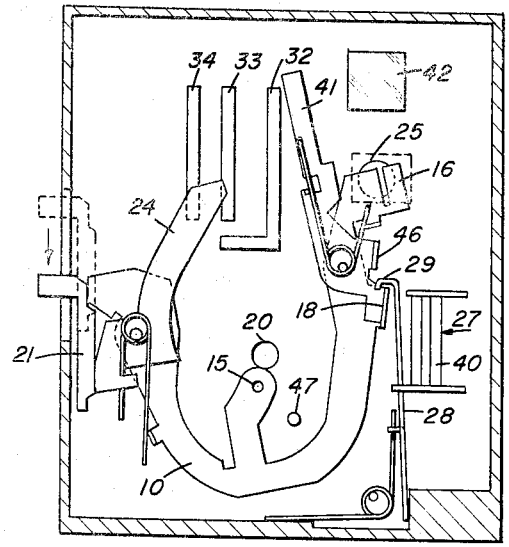
Figure 4:
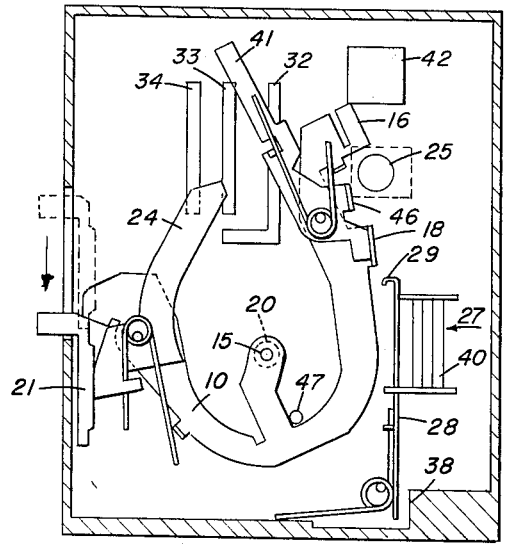
Figure 5:
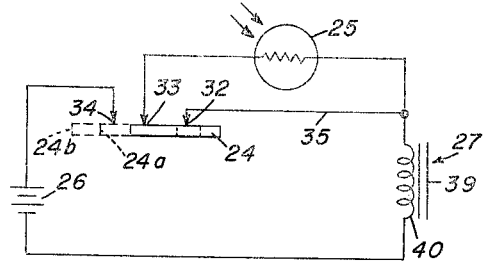

The invention will be more clearly understood from the following specification and the accompanying drawings wherein:

FIGS. 1–4 show partially schematic, partially sectioned, front views of an embodiment of the invention at various stages of an operative sequence; and FIG. 5 shows a diagram of an electric circuit usable in the inventive structure.

In FIGS. 1–4 an embodiment of the exposure control system according to this invention is shown arranged within a camera body 9. The illustrated camera has a taking lens aperture 20 of fixed maximum size and a control member 10 which is movable for positioning an auxiliary aperture 15 of reduced size in registry with aperture 20 for reducing the effective aperture size and therefore the exposure of a photosensitive surface in the camera. The invention is not limited to one such reduced size aperture, but for simplicity of illustration, only one such auxiliary aperture is shown.

Figure 1:
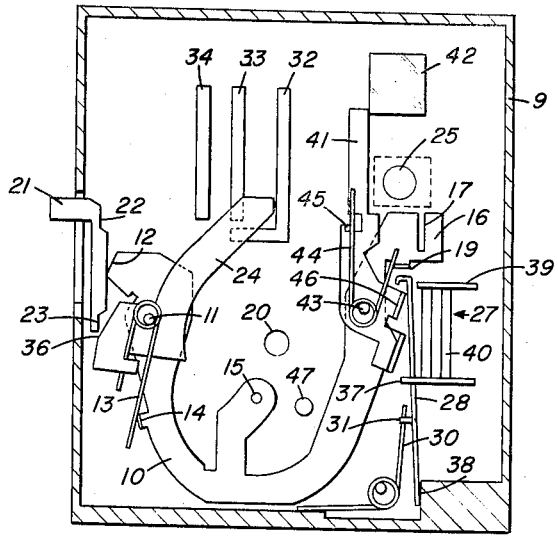

Control member 10 is biased for counterclockwise rotation about a pivot 11 by a spring 13 which presses against a projection 14, but as shown in FIG. 1, control member 10 is restrained from such rotation by a control member follower surface 12 resting against a camera release or actuating mechanism 21. Depression of camera release 21 to the positions illustrated in FIGS. 2–4 allows counterclockwise movement of control member 10 for effecting exposure control in accordance with sensed illumination.

In accordance with my invention, means are provided for stopping counterclockwise rotation of control member 10 at a position correlated with the intensity of illumination of a photoresponsive element such as photocell 25. Photocell 25 is shown in FIG. 5 as a photoconductive cell but may be any of a variety of photoresponsive elements including photovoltaic cells, photoemissive cells, and phototransistors. Photocell 25 is powered by a battery 26 and arranged to be illuminated by scene light for variably energizing a coil 40 of an electromagnet 27 as a function of the luminous flux falling on cell 25.

The energization of electromagnet 27 is also governed by the position of a switch arm 24. In the position illustrated in FIG. 1 and shown in solid lines in FIG. 5, switch arm 24 electrically connects only switch contacts 32 and 33, so that battery 26 is effectively disconnected from electromagnet 27 and cell 25 which are therefore not energized. Movement of switch arm 24 to the first broken line position 24a illustrated in FIG. 5 electrically connects contacts 32, 33 and 34 for connecting battery 26 directly across electromagnet 27 and for shorting out cell 25 by means of a shorting lead 35. Such energization of coil 40 by the full power of battery 25 produces a predetermined maximum energization and corresponding maximum magnetic flux in the magnetic circuit of electromagnet 27. This standardized maximum magnetic flux value for the electromagnet's magnetic circuit for each operative cycle of the control mechanism serves to counteract the magnetic variations which would otherwise be caused by hysteresis effect in the iron in the magnetic circuit if the initial level of magnetization varied from cycle to cycle. Such cyclically standardized magnetic flux can conveniently be of such value as to produce substantial magnetic saturation of the iron in the magnetic circuit, but can also be other predetermined values of magnetization.

Movement of switch arm 24 to the second broken line position 24b illustrated in FIG. 5 electrically connects contacts 33 and 34 and effectively disconnects contact 32 and shorting lead 35 from battery 26. For such a switch position, cell 25 is in series with battery 26 and electromagnet 27, and coil 40 of the latter is energized as a function of the illumination of cell 25. Because of the illumination-responsive resistance of cell 25, such energization is less than that produced by connecting battery 26 directly across electromagnet 27.

The above-described movements of switch arm 24 are produced in response to movement of the camera release 21. As shown in FIG. 1, switch arm 24 is in its initial position electrically connecting only contacts 32 and 33. Downward movement of camera release 21 brings a switch-cam surface 23 of release 21 into engagement with switch follower surface 36 for moving switch arm 24 counterclockwise about pivot 11 against the bias of spring 13. As previously described, the initial movement of switch arm 24 electrically connects contacts 32, 33 and 34, while further movement of release 21 brings switch arm 24 to the position illustrated in FIG. 2 where in only contacts 33 and 34 are electrically connected.

The magnetic circuit of electromagnet 27 includes an armature 28 pivotally mounted on a bracket 37 and urged in a counterclockwise rotational direction by an armature spring 30 which pushes against an abutment member 31 for forcing the armature 28 against a stop 38. The upper end of armature 28 is provided with a hook 29 for selectively engaging projections such as catch or stop projection 18 on control member 10 or a projection 46 on a low light signal member 41 for respectively limiting the counterclockwise rotation of control member 10 or actuating the low light signal member 41.

When electromagnet 27 is fully energized by battery 26 as described above, the magnetic flux is sufficient for pivoting armature 28 clockwise to an inactive or retracted position close against the core 39 of electromagnet 27, as shown in FIG. 4. In such position projections 46 and 18 are free to pass by armature hook 29. However, whenever the energization of coil 40 falls below a predetermined minimum value, spring 30 overcomes the magnetic forces of electromagnet 27 and pivots armature 28 counterclockwise away from core 39 and into its active position relative to member 10.

Control member 10 is provided with light attenuating or masking means shown as a vane 16 having a slot 17 so arranged as to partially mask cell 25 as control member 10 rotates counterclockwise. Such rotation of control member 10 thus progressively reduces the illumination of cell 25, which in turn causes reduction of the energization of electromagnet 27.

Figure 2:
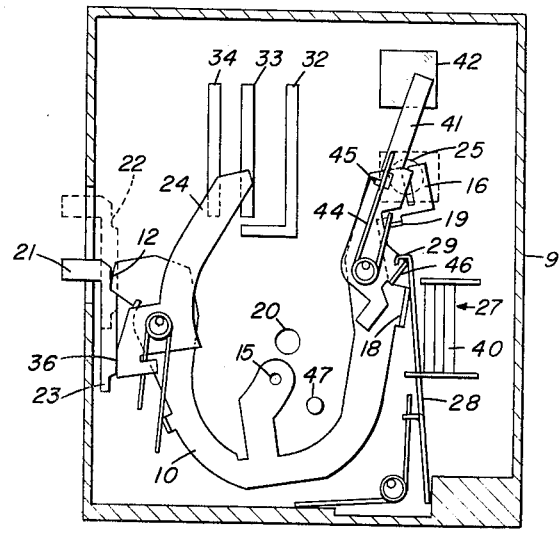

A cam surface 22 on camera release 21 cooperates with the control member follower surface 12 to limit the initial counterclockwise rotation of control member 10 to the position illustrated in FIG. 2 wherein mask 16 partially covers cell 25, and the effective aperture size is unchanged. Because of the shape of cam surface 22 a "dwell" or hesitation of control member 10 in such position is provided to allow sufficient time for reaction of armature 28 in response to the reduced illumination of cell 25 as effected by mask vane 16. Further movement of release 21 moves surface 22 past surface 12, thereby permitting continued counterclockwise rotation of control member 10 for placing reduced size aperture 15 in registry with aperture 20, to decrease the effective aperture size as shown in FIG. 4.

Further movement of release 21 also actuates a camera shutter (not shown), a spring (not shown) returns release 21 to its initial position, and such returning of release 21 moves control member 10 clockwise to its initial position as illustrated in FIG. 1.

The low-light signal member 41 is mounted on control member 10 for rotation about a pivot 43 and is biased in a counterclockwise direction relative thereto by a spring 44, one arm of which rests against a projection 19 on control member 10 and the other arm of which rests against a projection 45 on low-light signal member 41. Low-light signal member 41 also has a stop or catch projection 46 arranged to afford means for armature hook 29 to catch and hold on to for actuating the signal. As illustrated in FIG. 2, such catching and holding of projection 46 by armature hook 29, pivots low-light signal member 41 clockwise as control member 10 swings counterclockwise in response to surface 12 moving into engagement with release cam surface 22. The result is that low-light signal member 41 swings into view in a viewfinder 42 for signaling the camera operator of a low-light condition.

Of course, low-light signal member 41 could be integral with control member 10 and arranged to be visible in the viewfinder until catch projection 46 passes beyond armature hook 29 whereupon disappearance of low-light signal member 41 from view in viewfinder 42 would indicate adequate illumination for a photographic exposure. Also, mask vane 16 could be made integral with low-light signal member 41 rather than control member 10 as shown.

*Operation*

To make a photographic exposure controlled by the above-described structure, the camera operator presses down on camera release 21. Cooperation between release cam surface 23 and switch follower surface 36 moves switch arm 24 for electrically connecting all of contacts 32, 33 and 34, thus energizing coil 40 of electromagnet 27 by the full power of battery 26. Such energization establishes a standard maximum value of magnetism in the magnetic circuit of electromagnet 27 and brings armature 28 against core 39. In such a position, hook 29 of armature 28 cannot catch on projections 46 or 18. Continued movement of camera release 21 moves switch arm 24 to connect only contacts 33 and 34 as shown in FIGS. 2-4 whereby energization of electromagnet 27 is reduced to a value which is a function of the illumination of cell 25.

If illumination falling on the entire cell 25 is inadequate for a photographic exposure at maximum aperture size of film in the camera, electromagnet 27 is insufficiently energized to hold armature 28 which thereupon pivots counterclockwise to a position in which its hook 29 can catch projection 46 and thereby actuate low-light signal member 41 as control member 10 pivots counterclockwise.

If scene light conditions are at least adequate for a photographic exposure at maximum aperture size 20, the energization of electromagnet 27 is sufficient to hold armature 28 against core 39 until projection 46 passes beyond armature hook 29. This occurs as further movement of release 21 brings cam surface 22 opposite control member follower surface 12, as shown in FIG. 2, thus allowing initial counterclockwise rotation of control member 10 under action of spring 13 and masking of cell 25 by mask vane 16. As the illumination of cell 25 is reduced because of masking, the energization of electromagnet 27 is also reduced. If scene light is not sufficiently bright for a photographic exposure at reduced effective aperture size 15, masking of cell 25 by mask 16 so reduces the energization of electromagnet 27 that armature 28 pivots away from core 39 and hook 29 moves into position to catch projection 18, preventing movement of control member 10 beyond the position illustrated in FIG. 3.

However, if scene light is sufficiently bright for a photographic exposure at the reduced effective aperture size, energization of electromagnet 27 will be sufficient for holding armature 28 against core 39 even after masking of cell 25, so that projection 18 may pass armature hook 29 and control member 10 will be free to rotate further counterclockwise until it engages stop 47, as shown in FIG. 4. In such position, aperture 15 is registered with aperture 20.

Thus, by means of the above-described simple and economic structure, a camera operator may be apprised of a low-light condition, or two different effective aperture sizes may be automatically selected without effort on the part of the camera operator. Of course, the invention is not limited to selection of two aperture sizes, since additional projections and corresponding aperture sizes obviously may be added.

The invention has been described in detail, with particular reference to a preferred embodiment thereof, but it will be understood that variations and modifications can be effected within the spirit and scope of the invention as described hereinabove and as defined in the appended claims.

The embodiments of the invention in which an exclusive property or privilege is claimed are defined as follows:

1. An exposure control mechanism for a camera comprising in combination:
    (a) a taking lens aperture;
    (b) a source of electric potential;
    (c) a photoresponsive element illuminatable by scene light;
    (d) an electromagnet having an energizable coil and a magnetic circuit including a movable armature positionable in accordance with the energization of said coil, the positions of said armature including a first position closely proximate said electromagnet and a second position comparatively spaced from said electromagnet, said armature assuming said second position in response to energization of said coil at less than a predetermined value;
    (e) a movable actuating member;
    (f) means electrically in circuit with said source, said element, and said coil and operable in response to movement of said actuating member for (1) first energizing said coil to position said armature in said first position and to produce a predetermined value of magnetism in said magnetic circuit, and (2) thereafter reducing the energization of said coil to a new value as a function of the illumination of said element;

(g) control means movable in response to movement of said actuating member for adjusting the effective size of said aperture;

(h) mask means movable with said control means for varying the illumination of said element; and (i) means responsive to the positioning of said armature in said second position for stopping movement of said control means for setting said diaphragm aperture as a function of said scene light.

2. The exposure control mechanism of claim 1 having a low light signal member movable with said control means and actuatable for signaling the camera operator and having means for actuating said low light signal member operable upon the positioning of said armature in said second position in response to a predetermined low level of scene light.

3. The exposure control system of claim 1 wherein a spring biases said control means and said stopping means holds said control means from movement in response to said spring.

4. In a camera having a view finder and an effectively adjustable taking lens aperture, an exposure control mechanism comprising:

(a) a battery;

(b) a photocell illuminatable by scene light;

(c) an electromagnet having an energizable coil and a magnetic circuit including a core and a movable armature positionable in accordance with the energization of said coil in one of two positions consisting of a first position closely proximate said core and a second position comparatively spaced from said core, said armature assuming said second position in response to energization of said coil at less than a predetermined value;

(d) a movable actuating member;

(e) switch means electrically in circuit with said battery, said photocell, and said coil and operable in response to movement of said actuating member for sequentially (1) first electrically connecting said battery and said coil for energizing the latter to position said armature in said first position and to produce a predetermined high degree of magnetization in said magnetic circuit, and (2) thereafter electrically connecting in series said battery, said photocell, and said coil for reducing the energization of said coil to a new value as a function of the illumination of said element;

(f) control means movable in response to movement of said actuating member for effectively reducing diaphragm aperture size;

(g) mask means movable with said control means for reducing the illumination of said photocell;

(h) a low light signal member movable with said control means and actuatable for producing an indication visible in said viewfinder;

(i) signal actuating means engageable by said armature in said second position for actuating said low light signal in response to a predetermined low value of scene light; and (j) means engageable by said armature in said second position for stopping movement of said control means in response to reduced energization of said coil as effected by masking of said photocell to position said control member for effectively adjusting said aperture size as a function of said scene light.

5. Exposure control means for a photographic camera having an exposure aperture, comprising in combination:

(a) illumination-responsive means including a solenoid, a photocell, and circuit means for energizing said solenoid in accordance with the illumination of said cell;

(b) a control element movable successively from an inactive position to and past an intermediate position and to an aperture-reducing position wherein it causes a predetermined reduction of the effective size of said exposure aperture;

(c) masking means movable with said control element for reducing the illumination of said photocell in response to positioning of said control element in said intermediate position;

(d) an actuating member movable from a normal position successively to and past a plurality of spaced advanced positions;

(e) means for biasing said control element toward said aperture-reducing position;

(f) means rendered effective in accordance with the position of said actuating member and co-acting with said control element to prevent movement of said element from said inactive to said intermediate position until said member has been moved past a predetermined one of said advanced positions and to prevent further movement of said control member to said aperture-reducing position until said member has been moved past a succeeding one of said advanced positions; and (g) means controlled by said solenoid and effective upon the energization thereof falling below a predetermined level for blocking movement of said control element from said intermediate to said aperture-reducing position.

6. The exposure control means of claim 5 wherein said circuit means includes means for energizing said solenoid to a predetermined high value independent of the illumination of said cell, and means for reducing said predetermined high value of energization to a lower value of energization as a function of the illumination of said cell.

No references cited.

NORTON ANSHER, *Primary Examiner.*